US008768700B1

(12) United States Patent
Franz et al.

(10) Patent No.: US 8,768,700 B1
(45) Date of Patent: Jul. 1, 2014

(54) VOICE SEARCH ENGINE INTERFACE FOR SCORING SEARCH HYPOTHESES

(75) Inventors: Alexander Mark Franz, Palo Alto, CA (US); Monika H. Henzinger, Menlo Park, CA (US); Sergey Brin, Palo Alto, CA (US); Brian Christopher Milch, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/615,738

(22) Filed: Sep. 14, 2012

Related U.S. Application Data

(63) Continuation of application No. 13/273,925, filed on Oct. 14, 2011, now Pat. No. 8,380,502, which is a continuation of application No. 12/047,108, filed on Mar. 12, 2008, now Pat. No. 8,515,752, which is a continuation of application No. 11/346,182, filed on Feb. 3, 2006, now Pat. No. 7,366,668, which is a continuation of application No. 09/777,863, filed on Feb. 7, 2001, now Pat. No. 7,027,987.

(51) Int. Cl.
*G10L 15/08* (2006.01)
*G10L 15/14* (2006.01)
*G06F 17/30* (2006.01)

(52) U.S. Cl.
USPC ........... 704/252; 704/236; 704/255; 707/721; 707/768

(58) Field of Classification Search
CPC ......... G10L 15/08; G10L 15/14; G06F 17/30; G06F 17/30026; G06F 17/30395; G06F 17/30646; G06F 17/30663; G06F 17/30672

USPC ......... 704/235, 236, 251, 252, 255, 270, 275; 707/721, 751, 768
See application file for complete search history.

(56) References Cited

U.S. PATENT DOCUMENTS

| 4,771,384 A | 9/1988 | Daniels et al. |
| 4,980,918 A | 12/1990 | Bahl et al. |
| 5,170,440 A | 12/1992 | Cox |
| 5,241,619 A | 8/1993 | Schwartz et al. |
| 5,349,645 A | 9/1994 | Zhao |

(Continued)

FOREIGN PATENT DOCUMENTS

WO    WO 00/45375    8/2000

OTHER PUBLICATIONS

Co-pending U.S. Appl. No. 12/047,108, filed Mar. 12, 2008 entitled "Voice Interface for a Search Engine" by Alexander Mark Franz et al., 35 pages.

*Primary Examiner* — Martin Lerner
(74) *Attorney, Agent, or Firm* — Harrity & Harrity, LLP

(57) ABSTRACT

A system may receive a voice search query and may determine word hypotheses for the voice query. Each word hypothesis may include one or more terms. The system may obtain a search query log and may determine, for each word hypothesis, a quantity of other search queries, in the search query log, that include the one or more terms. The system may determine weights based on the determined quantities. The system may generate, based on the weights, a first search query from the word hypotheses and may obtain a first set of search results. The system may modify, based on the first set of search results, one or more of the weights. The system may generate a second search query from the word hypotheses and obtain, based on the second search query, a second set of search results for the voice query.

20 Claims, 7 Drawing Sheets

(56) References Cited

U.S. PATENT DOCUMENTS

| | | | |
|---|---|---|---|
| 5,404,507 A | 4/1995 | Bohm et al. | |
| 5,442,781 A | 8/1995 | Yamagata | |
| 5,500,920 A | 3/1996 | Kupiec | |
| 5,598,557 A | 1/1997 | Doner et al. | |
| 5,634,083 A | 5/1997 | Oerder | |
| 5,680,511 A | 10/1997 | Baker et al. | |
| 5,689,616 A | 11/1997 | Li | |
| 5,696,962 A | 12/1997 | Kupiec | |
| 5,712,957 A | 1/1998 | Waibel et al. | |
| 5,729,659 A | 3/1998 | Potter | |
| 5,749,069 A | 5/1998 | Komori et al. | |
| 5,805,771 A | 9/1998 | Muthusamy et al. | |
| 5,826,260 A | 10/1998 | Byrd et al. | |
| 5,873,076 A * | 2/1999 | Barr et al. | 704/270.1 |
| 5,893,092 A * | 4/1999 | Driscoll | 704/9 |
| 5,933,822 A | 8/1999 | Braden-Harder et al. | |
| 5,937,383 A | 8/1999 | Ittycheriah et al. | |
| 5,983,176 A | 11/1999 | Hoffert et al. | |
| 5,987,457 A | 11/1999 | Ballard | |
| 6,014,664 A | 1/2000 | Fagin et al. | |
| 6,026,398 A | 2/2000 | Brown et al. | |
| 6,061,646 A | 5/2000 | Martino et al. | |
| 6,112,172 A | 8/2000 | True et al. | |
| 6,157,910 A | 12/2000 | Ortega | |
| 6,167,398 A | 12/2000 | Wyard et al. | |
| 6,169,986 B1 | 1/2001 | Bowman et al. | |
| 6,173,266 B1 | 1/2001 | Marx et al. | |
| 6,185,528 B1 | 2/2001 | Fissore et al. | |
| 6,185,558 B1 * | 2/2001 | Bowman et al. | 705/37 |
| 6,192,343 B1 * | 2/2001 | Morgan et al. | 704/275 |
| 6,243,713 B1 | 6/2001 | Nelson et al. | |
| 6,275,802 B1 | 8/2001 | Aelten | |
| 6,275,803 B1 | 8/2001 | Lewis | |
| 6,278,998 B1 | 8/2001 | Ozden et al. | |
| 6,292,775 B1 | 9/2001 | Holmes | |
| 6,292,779 B1 | 9/2001 | Wilson et al. | |
| 6,311,182 B1 | 10/2001 | Colbath et al. | |
| 6,314,398 B1 | 11/2001 | Junqua et al. | |
| 6,338,057 B1 | 1/2002 | Weeks | |
| 6,345,252 B1 | 2/2002 | Beigi et al. | |
| 6,345,253 B1 | 2/2002 | Viswanathan | |
| 6,349,282 B1 | 2/2002 | Van Aelten et al. | |
| 6,385,579 B1 | 5/2002 | Padmanabhan et al. | |
| 6,393,399 B1 | 5/2002 | Even | |
| 6,397,181 B1 | 5/2002 | Li et al. | |
| 6,401,084 B1 * | 6/2002 | Ortega et al. | 707/706 |
| 6,415,257 B1 | 7/2002 | Junqua et al. | |
| 6,415,282 B1 | 7/2002 | Mukherjea et al. | |
| 6,418,431 B1 | 7/2002 | Mahajan et al. | |
| 6,430,531 B1 * | 8/2002 | Polish | 704/257 |
| 6,434,524 B1 | 8/2002 | Weber | |
| 6,442,519 B1 | 8/2002 | Kanevsky et al. | |
| 6,456,970 B1 | 9/2002 | Kao | |
| 6,480,819 B1 | 11/2002 | Boman et al. | |
| 6,484,136 B1 | 11/2002 | Kanevsky et al. | |
| 6,484,166 B1 | 11/2002 | Maynard | |
| 6,499,013 B1 | 12/2002 | Weber | |
| 6,504,571 B1 | 1/2003 | Narayanaswami et al. | |
| 6,513,063 B1 * | 1/2003 | Julia et al. | 709/219 |
| 6,519,562 B1 | 2/2003 | Phillips et al. | |
| 6,529,903 B2 | 3/2003 | Smith et al. | |
| 6,532,444 B1 | 3/2003 | Weber | |
| 6,553,345 B1 | 4/2003 | Kuhn et al. | |
| 6,615,172 B1 | 9/2003 | Bennett et al. | |
| 6,625,595 B1 | 9/2003 | Anderson et al. | |
| 6,671,681 B1 * | 12/2003 | Emens et al. | 707/706 |
| 6,678,681 B1 | 1/2004 | Brin | |
| 6,701,309 B1 * | 3/2004 | Beeferman et al. | |
| 6,701,312 B2 | 3/2004 | Lau et al. | |
| 6,721,705 B2 | 4/2004 | Kurganov et al. | |
| 6,745,161 B1 | 6/2004 | Arnold et al. | |
| 6,751,606 B1 | 6/2004 | Fries et al. | |
| 6,766,320 B1 * | 7/2004 | Wang et al. | 704/9 |
| 6,772,150 B1 * | 8/2004 | Whitman et al. | 707/721 |
| 6,865,575 B1 | 3/2005 | Smith et al. | |
| 6,873,982 B1 | 3/2005 | Bates et al. | |
| 6,885,990 B1 | 4/2005 | Ohmori et al. | |
| 6,944,611 B2 | 9/2005 | Flank et al. | |
| 6,973,429 B2 | 12/2005 | Smith | |
| 7,027,987 B1 | 4/2006 | Franz et al. | |
| 7,072,872 B2 | 7/2006 | Caid et al. | |
| 7,113,910 B1 * | 9/2006 | Pereira et al. | 704/270 |
| 7,136,854 B2 | 11/2006 | Smith et al. | |
| 7,296,009 B1 | 11/2007 | Jiang et al. | |
| 7,366,668 B1 | 4/2008 | Franz et al. | |
| 7,401,023 B1 * | 7/2008 | Schwartz et al. | 704/275 |
| 7,555,428 B1 | 6/2009 | Franz et al. | |
| 8,200,485 B1 | 6/2012 | Lee | |
| 8,380,502 B1 | 2/2013 | Franz et al. | |
| 8,515,752 B1 * | 8/2013 | Franz et al. | 704/236 |
| 8,650,031 B1 * | 2/2014 | Mamou et al. | 704/235 |
| 2004/0059718 A1 * | 3/2004 | Zhou et al. | 707/3 |
| 2005/0149499 A1 | 7/2005 | Franz et al. | |
| 2011/0213613 A1 * | 9/2011 | Cohen et al. | 704/235 |
| 2012/0023088 A1 * | 1/2012 | Cheng et al. | 707/707 |

* cited by examiner

VOICE SEARCH ENGINE INTERFACE FOR SCORING SEARCH HYPOTHESES

RELATED APPLICATIONS

This application is a continuation of U.S. patent application Ser. No. 13/273,925, filed Oct. 14, 2011, which is a continuation of U.S. patent application Ser. No. 12/047,108, filed on Mar. 12, 2008, which is a continuation of U.S. patent application Ser. No. 11/346,182, filed on Feb. 3, 2006 (now U.S. Pat. No. 7,366,668), which is a continuation of U.S. patent application Ser. No. 09/777,863, filed on Feb. 7, 2001 (now U.S. Pat. No. 7,027,987). The entire contents of all four applications are incorporated herein by reference in their entireties.

FIELD OF THE INVENTION

The present invention relates generally to information retrieval systems and, more particularly, to a system and method for supporting voice queries in information retrieval systems.

BACKGROUND OF THE INVENTION

To satisfy the average user, a voice interface to a search engine must recognize spoken queries, and must return highly relevant search results. Several problems exist in designing satisfactory voice interfaces. Current speech recognition technology has high word error rates for large vocabulary sizes. There is very little repetition in queries, providing little information that could be used to guide the speech recognizer. In other speech recognition applications, the recognizer can use context, such as a dialogue history, to set up certain expectations and guide the recognition. Voice search queries lack such context. Voice queries can be very short (on the order of only a few words or single word), so there is very little information in the utterance itself upon which to make a voice recognition determination.

Current voice interfaces to search engines address the above problems by limiting the scope of the voice queries to a very narrow range. At every turn, the user is prompted to select from a small number of choices. For example, at the initial menu, the user might be able to choose from "news," "stocks," "weather," or "sports." After the user chooses one category, the system offers another small set of choices. By limiting the number of possible utterances at every turn, the difficulty of the speech recognition task is reduced to a level where high accuracy can be achieved. This approach results in an interactive voice system that has a number of severe deficiencies. It is slow to use since the user must navigate through may levels of voice menus. If the user's information need does not match a predefined category, then it becomes very difficult or impossible to find the information desired. Moreover, it is often frustrating to use, since the user must adapt his/her interactions to the rigid, mechanical structure of the system.

Therefore, there exists a need for a voice interface that is effective for search engines.

SUMMARY OF THE INVENTION

A system and method consistent with the present invention address this and other needs by providing a voice interface for search engines that is capable of returning highly relevant results.

In accordance with the purpose of the invention as embodied and broadly described herein, a method that provides search results includes receiving a voice search query from a user; deriving one or more recognition hypotheses from the voice search query, each recognition hypothesis being associated with a weight; constructing a weighted boolean query using the recognition hypotheses; providing the weighted boolean query to a search system; and providing results of the search system.

In another implementation consistent with the present invention, a server includes a memory and a processor. The processor receives one or more recognition hypotheses. The recognition hypotheses are constructed from a voice search query. The processor also determines the length of the shortest recognition hypothesis, prunes the length of each recognition hypothesis up to the length of the shortest recognition hypothesis, determines a length of a longest pruned recognition hypothesis, selects a number of recognition hypotheses based on a value representing the length of the longest recognition hypothesis, determines query term weights, and forms a weighted boolean query out of each word position in the selected recognition hypotheses.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims.

Implementations consistent with the present invention provide a voice interface to search engines. In response to a voice query, a server automatically constructs a search query to cover the most likely hypotheses identified by a speech recognizer.

Exemplary Network

Figure 1:
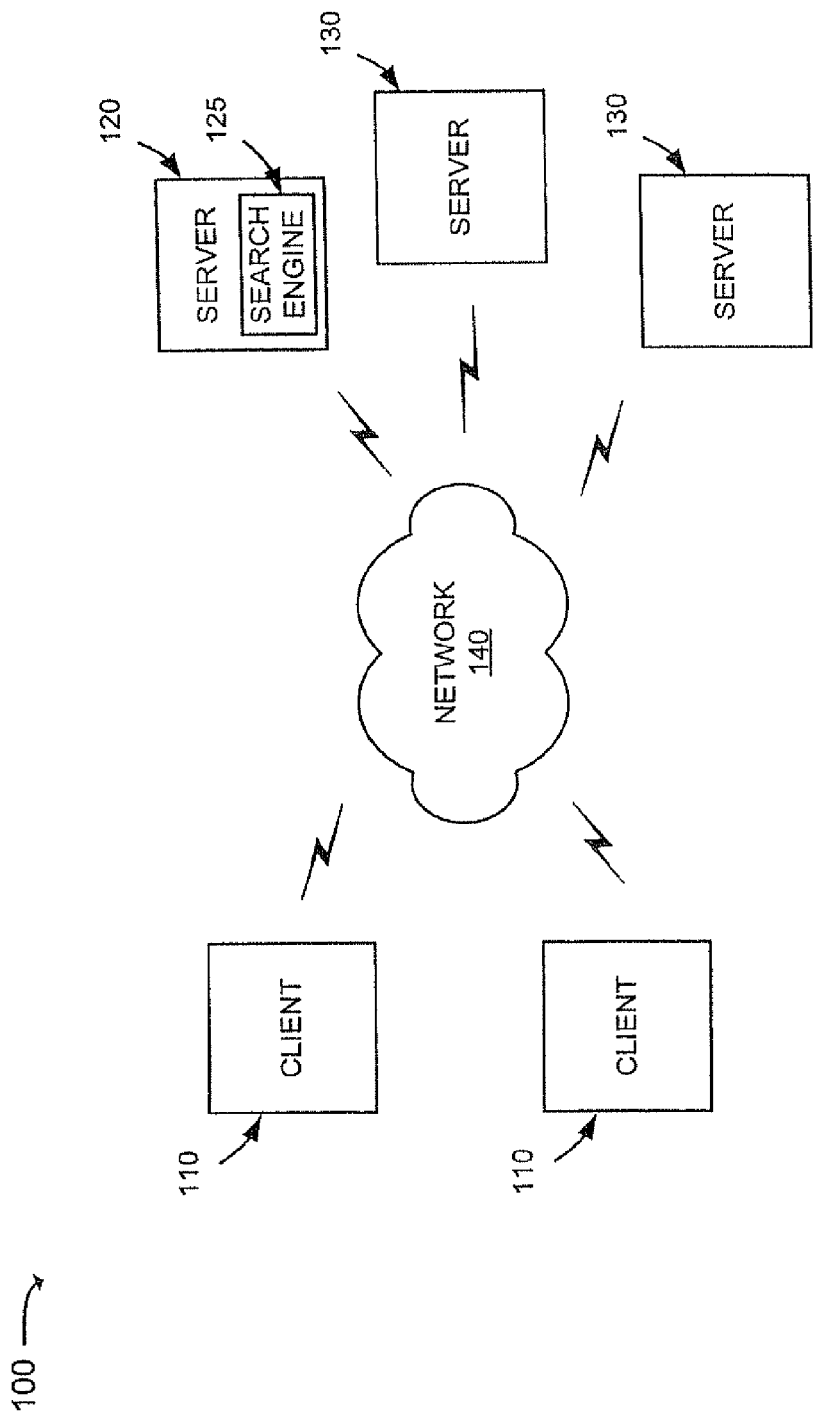
FIG. 1 illustrates an exemplary network in which a system and method, consistent with the present invention, may be implemented.

FIG. 1 illustrates an exemplary network 100 in which a system and method, consistent with the present invention, may be implemented. The network 100 may include multiple client devices 110 connected to multiple servers 120-130 via a network 140. The network 140 may include a local area network (LAN), a wide area network (WAN), a telephone network, such as the Public Switched Telephone Network (PSTN), an intranet, the Internet, or a combination of networks. Two client devices 110 and three servers 120-130 have been illustrated as connected to network 140 for simplicity. In practice, there may be more or less client devices and servers. Also, in some instances, a client device may perform the functions of a server and a server may perform the functions of a client device.

The client devices 110 may include devices, such as mainframes, minicomputers, personal computers, laptops, personal digital assistants, telephones, or the like, capable of connecting to the network 140. The client devices 110 may transmit data over the network 140 or receive data from the network 140 via a wired, wireless, or optical connection.

The servers 120-130 may include one or more types of computer systems, such as a mainframe, minicomputer, or personal computer, capable of connecting to the network 140 to enable servers 120-130 to communicate with the client devices 110. In alternative implementations, the servers 120-130 may include mechanisms for directly connecting to one or more client devices 110. The servers 120-130 may transmit data over network 140 or receive data from the network 140 via a wired, wireless, or optical connection.

In an implementation consistent with the present invention, the server 120 may include a search engine 125 usable by the client devices 110. The servers 130 may store documents, such as web pages, accessible by the client devices 110.

Exemplary Client Architecture

Figure 2:
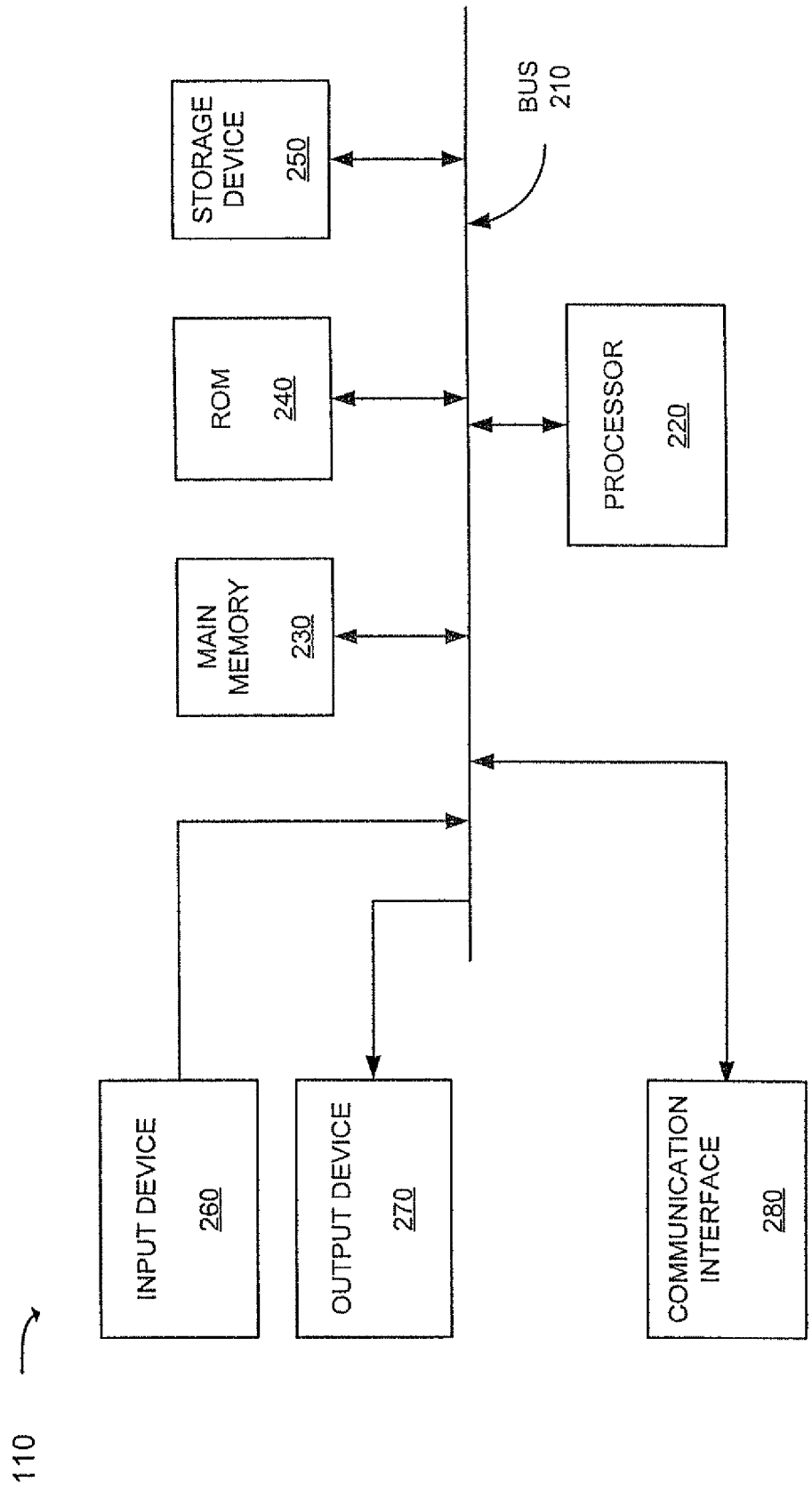
FIG. 2 illustrates an exemplary client device consistent with the present invention.

FIG. 2 illustrates an exemplary client device 110 consistent with the present invention. The client device 110 may include a bus 210, a processor 220, a main memory 230, a read only memory (ROM) 240, a storage device 250, an input device 260, an output device 270, and a communication interface 280. The bus 210 may include one or more conventional buses that permit communication among the components of the client device 110.

The processor 220 may include any type of conventional processor or microprocessor that interprets and executes instructions. The main memory 230 may include a random access memory (RAM) or another type of dynamic storage device that stores information and instructions for execution by the processor 220. The ROM 240 may include a conventional ROM device or another type of static storage device that stores static information and instructions for use by the processor 220. The storage device 250 may include a magnetic and/or optical recording medium and its corresponding drive.

The input device 260 may include one or more conventional mechanisms that permit a user to input information to the client device 110, such as a keyboard, a mouse, a pen, a microphone, voice recognition and/or biometric mechanisms, etc. The output device 270 may include one or more conventional mechanisms that output information to the user, including a display, a printer, a speaker, etc. The communication interface 280 may include any transceiver-like mechanism that enables the client device 110 to communicate with other devices and/or systems. For example, the communication interface 280 may include mechanisms for communicating with another device or system via a network, such as network 140.

As will be described in detail below, the client devices 110, consistent with the present invention, perform certain searching-related operations. The client devices 110 may perform these operations in response to processor 220 executing software instructions contained in a computer-readable medium, such as memory 230. A computer-readable medium may be defined as one or more memory devices and/or carrier waves.

The software instructions may be read into memory 230 from another computer-readable medium, such as the data storage device 250, or from another device via the communication interface 280. The software instructions contained in memory 230 causes processor 220 to perform the search-related activities described below. Alternatively, hardwired circuitry may be used in place of or in combination with software instructions to implement processes consistent with the present invention. Thus, the present invention is not limited to any specific combination of hardware circuitry and software.

Exemplary Server

Figure 3:
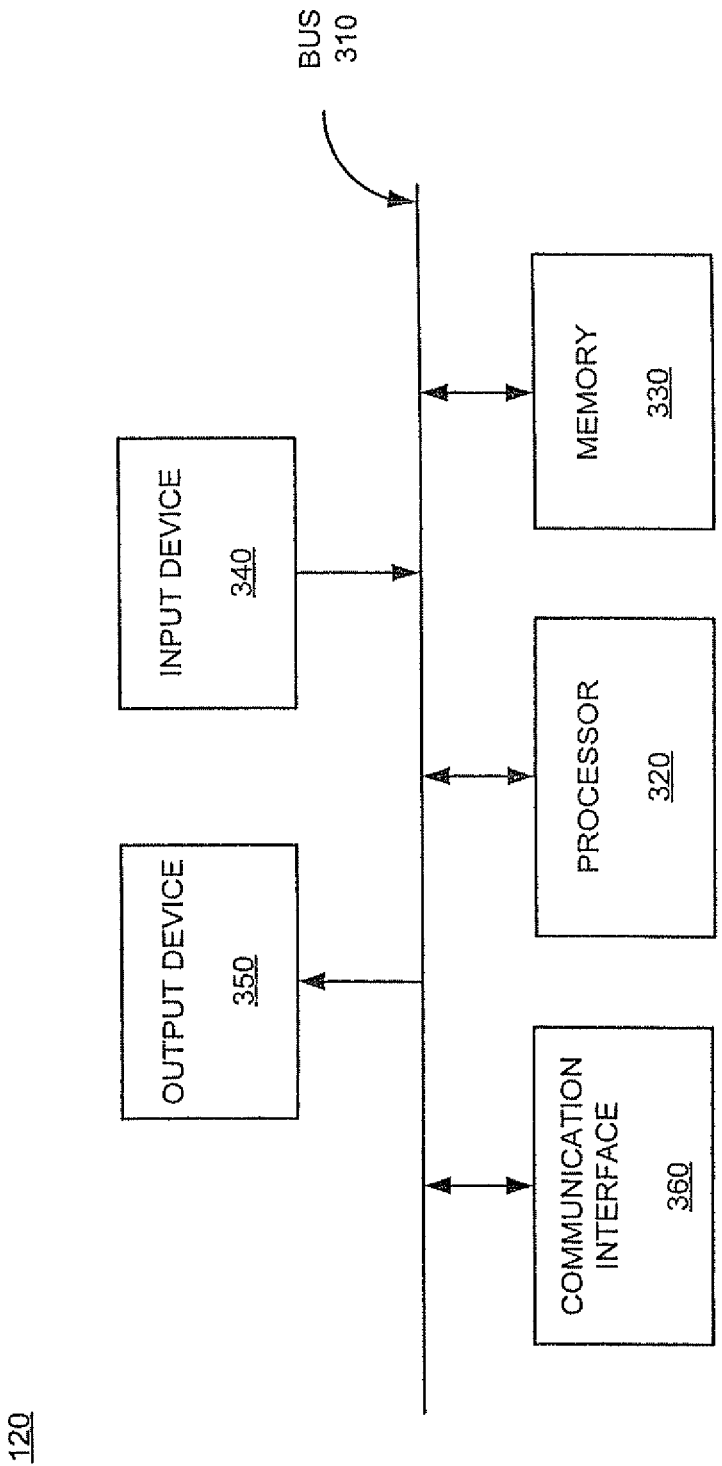
FIG. 3 illustrates an exemplary server consistent with the present invention.

FIG. 3 illustrates an exemplary server 120 consistent with the present invention. Server 130 may be similarly configured. The server 120 includes a bus 310, a processor 320, a memory 330, an input device 340, an output device 350, and a communication interface 360. The bus 310 may include one or more conventional buses that allow communication among the components of the server 120.

The processor 320 may include any type of conventional processor or microprocessor that interprets and executes instructions. The memory 330 may include a RAM or another type of dynamic storage device that stores information and instructions for execution by the processor 320; a ROM or another type of static storage device that stores static information and instructions for use by the processor 320; and/or some type of magnetic or optical recording medium and its corresponding drive.

The input device 340 may include one or more conventional devices that permits an operator to input information to the server 120, such as a keyboard, a mouse, a pen, a microphone, voice recognition and/or biometric mechanisms, and the like. The output device 350 may include one or more conventional devices that outputs information to the operator, including a display, a printer, a speaker, etc. The communication interface 360 may include any transceiver-like mechanism that enables the server 120 to communicate with other devices and/or systems. For example, the communication interface 360 may include mechanisms for communicating with other servers 130 or the client devices 110 via a network, such as network 140.

Execution of the sequences of instructions contained in memory 330 causes processor 320 to perform the functions described below. In alternative embodiments, hardwired circuitry may be used in place of or in combination with software instructions to implement the present invention. Thus, the present invention is not limited to any specific combination of hardware circuitry and software.

Exemplary Processing

Figure 4:
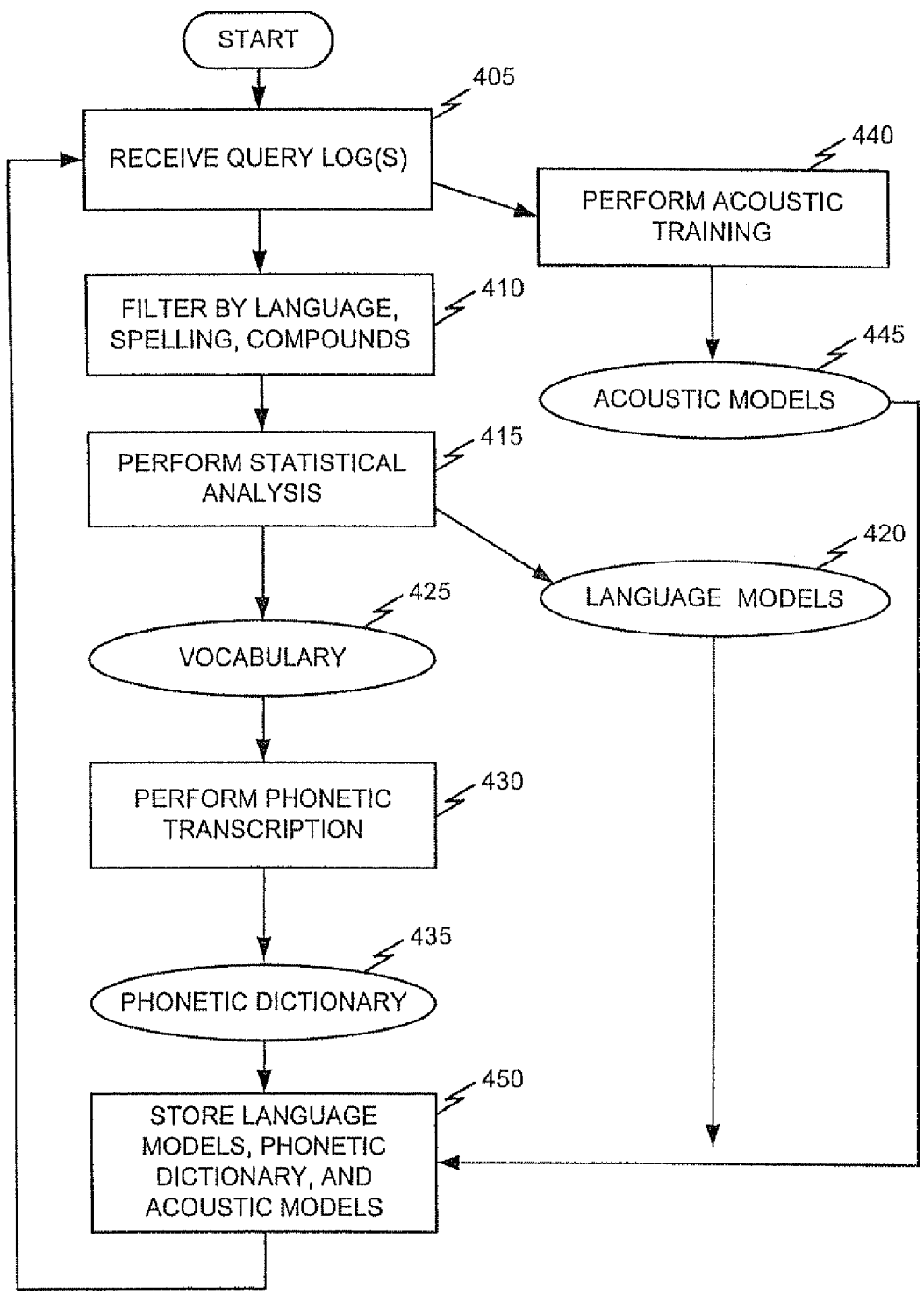
FIG. 4 illustrates an exemplary process, consistent with the present invention, for producing models for use in voice-based searching.

FIG. 4 illustrates an exemplary process, consistent with the present invention, for producing models for use in voice-based searching. In an implementation consistent with the present invention, a server, such as server 120, may perform this process. It will be appreciated, however, that a client device 110 may alternatively perform the entire process or part of the process described below.

Processing may begin with the server 120 receiving search query logs (i.e., one or more previously executed queries) [act 405]. The query logs may consist of audio data (i.e., a recorded query) and/or a textual transcription of the audio data. The textual transcription may be obtained manually or, as will be described in more detail below, may be automatically performed by the server 120. The query logs may also consist of typed query logs from, for example, a text-based search engine.

The server 120 may filter the query log to remove unwanted data [act 410]. The server 120 may filter the query log by language (e.g., English, French, Spanish, etc.), filter out misspelled words, filter out bad audio data, and/or filter out words that are not desirable.

The server 120 may then perform statistical analysis on the query log [act 415]. The server 120 may, for example, determine the most frequent queries, the most frequent words, the number of frequent words that cover a certain proportion of queries or query words, etc. The server 120 may also construct statistical language models 420 by counting the occurrence of words in certain contexts, smoothing the counts to obtain better probability estimates, and pruning the models to obtain a satisfactory size/effectiveness tradeoff. Language models 420 may be constructed for different users or different user groups. For example, the server 120 may construct a language model 420 for a user group consisting of English speakers with German accents and a different language model for a user group consisting of English speakers with French accents. As illustrated in FIG. 4, the statistical analysis process also produces a vocabulary 425. The vocabulary 425 provides a list of words and word compounds (i.e., words that commonly occur together) to be used during the speech recognition process described below.

The server 120 may phonetically transcribe the words in the vocabulary 425 [act 430]. Here, the server 120 may associate one or more phonetic transcriptions with each word in the vocabulary 425. This phonetic transcription may be performed manually or automatically by the server 120. As a result of performing the phonetic transcription, the server 120 produces a phonetic dictionary 435. The phonetic dictionary 435 associates a list of words (and compounds) with possible pronunciations.

In response to receiving the query logs [act 405], the server 120 may also perform acoustic training by recording actual audio samples [act 440]. These audio samples may be used to train acoustic models 445 that will be later used to aid in the speech recognition process. The server 120 may then store the language models 420, phonetic dictionary 435, and acoustic models 445 in memory [act 450]. The server 120 may, for example, store the language models 420, phonetic dictionary 435, and acoustic models 445 locally at the server 120 (e.g., in memory 330) or externally from the server 120.

The server 120 may perform the processing described above a single time or at predetermined times. For example, the server 120 may update the language models 420, phonetic dictionary 435, and acoustic models 445 at predetermined time intervals (e.g., every hour) or as new query logs are created.

Figure 5:
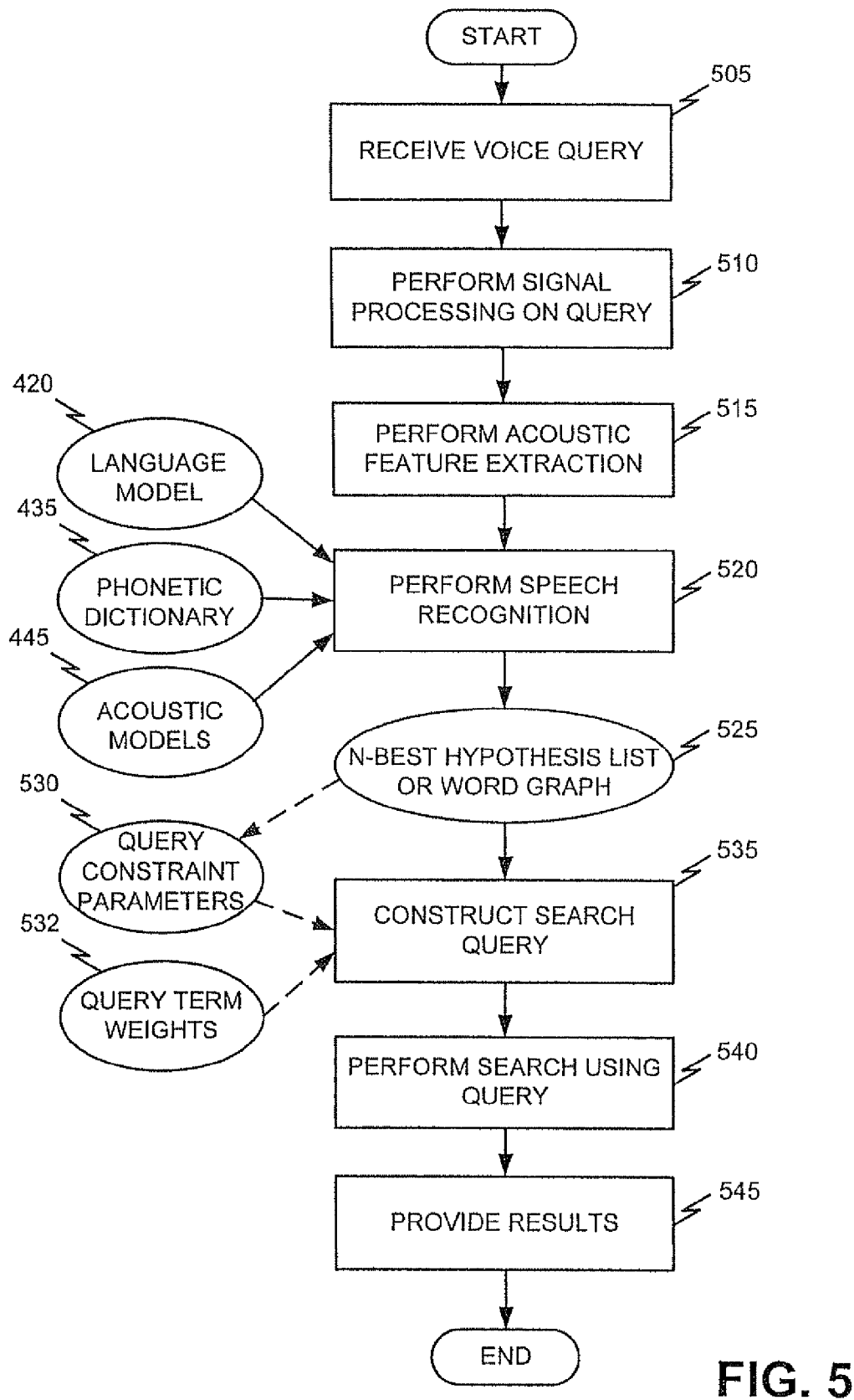
FIG. 5 illustrates an exemplary process, consistent with the present invention, for performing a search.

FIG. 5 illustrates an exemplary process, consistent with the present invention, for performing a search. While the foregoing acts are described as being performed by a server, it will be appreciated that a client device may alternatively perform some of the acts described below.

Processing may begin with a server, such as server 120, receiving a voice query [act 505]. The voice query may be received via the server's 120 input device 340 or over the network 140 via a separate device, such as a client device 110.

The server 120 may process the received voice query in a well-known manner to form a digital audio signal [act 510]. For example, the server 120 may perform analog-to-digital conversion to convert the audio signal to digital form and may break the digital audio signal into short windows (e.g., 10-20 ms frames). In an implementation consistent with the present invention, the server 120 may also determine which language model 420 is best suited for this voice query. For example, the server 120 may determine that a language model 420 directed to English speakers with German accents is best suited for this query.

The server 120 may then perform acoustic feature extraction in a well-known manner [act 515]. Within each of the short windows, the server 120 may look for acoustic features to identify the sound that was spoken, derive a short feature vector, and classify the feature vector into a small number of categories.

The server 120 may perform speech recognition processing in a well-known manner on the feature vectors to derive word hypotheses [act 520]. The server 120 may analyze the feature vectors using the phonetic dictionary 435 that links one or more acoustic representations to words, the language model 420 to assign a probability value to different possible sequences of what could have been spoken, and acoustic models 445 to match the sequence of feature vectors with actual sound units. The speech recognition processing results in a list of the n-best word hypotheses and/or a word graph 525.

In an implementation consistent with the present invention, the server 120 may associate a weight with each possible word or word combination. The server 120 may determine these weights from confidence scores from the speech recognition processing, a priori probability from the language model, or, as will be described in more detail below, the number of documents resulting from a search or the frequency of the words/compounds in the resulting documents. Alternatively, the server 120 may use a combination of these techniques for determining weights.

Figure 6A:
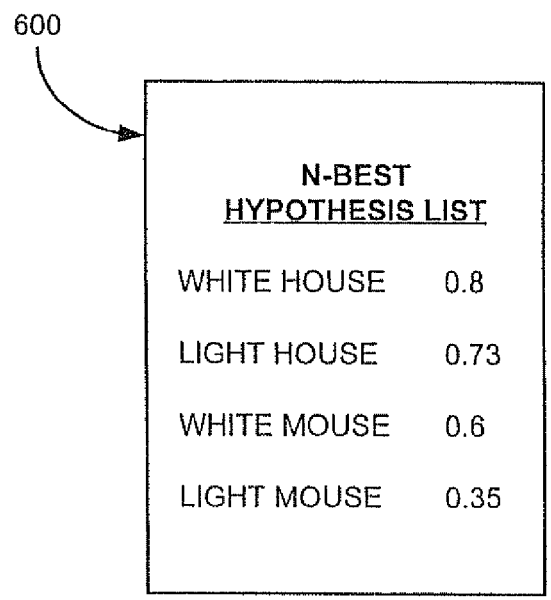
FIGS. 6A and 6B illustrate an exemplary n-best hypothesis list and a word graph, respectively, consistent with the present invention.
Figure 6B:
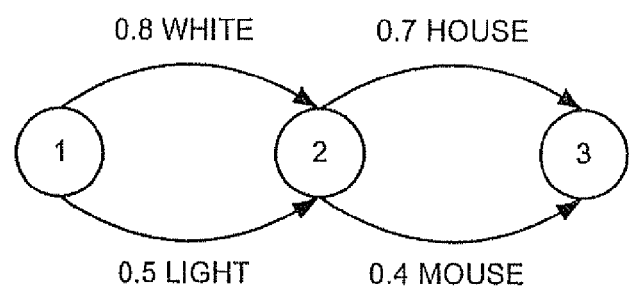

Assume, for example, that a user wanted to search for information relating to the White House. Upon receiving the voice query, the server 120 may determine that the user query contained the following possible words "white," "light," "house," and "mouse." FIGS. 6A and 6B illustrate an exemplary n-best hypothesis list 600 and a word graph 650, respectively, that may be produced by the server 120. As illustrated in FIG. 6A, the n-best hypothesis list 600 may contain a list of possible words or word-combinations that may be included in the voice query, along with associated weights. For example, the server 120 may determine that the voice query contains the word combinations "white house," "light house," "white mouse," or "light mouse" and may associate weights of 0.8, 0.73, 0.6, and 0.35, respectively, with these word combinations.

Alternatively, the server 120 may, as illustrated in FIG. 6B, produce a word graph 650 containing all word combination possibilities with associated weights. As illustrated, the server 120 may associate a weight of 0.8 with the word "white," a weight of 0.7 with the word "house," a weight of 0.5 with the word "light," and a weight of 0.4 with the word "mouse." As described above, the server 120 may determine these weights from confidence scores from the speech recognition processing, a priori probability from the language model, or search results.

The server 120 may set a group of query constraint parameters 530. These parameters may include the number of hypotheses to be considered (T), the total number of words to be included in a query (WordLimit), and the proportion of new words added from a first query possibility to a next query possibility (ProportionNewWords). These parameters may be automatically set by the server 120 or may be set manually. Moreover, these parameters may vary by user or user group.

Figure 7:
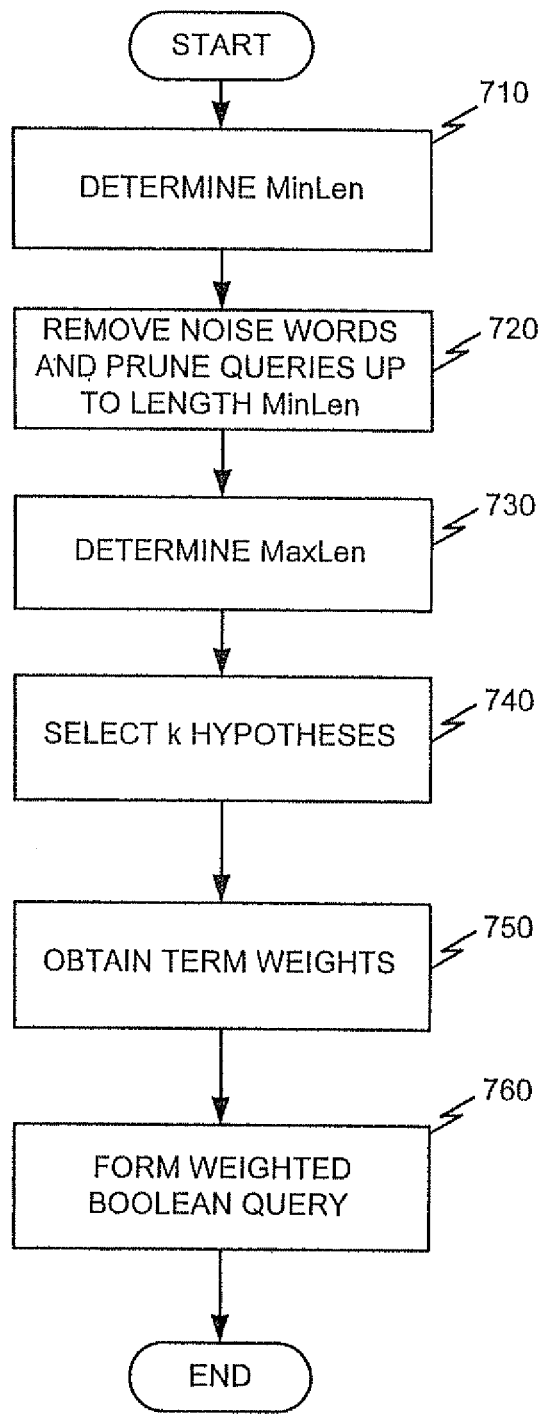
FIG. 7 illustrates an exemplary process, consistent with the present invention, for constructing a search query.

Using the query constraint parameters 530 and the query term weights 532, the server 120 may construct a search query from the hypothesis list or word graph [act 535]. The server 120 may construct the search query to cover all (or the most likely) possible hypotheses. FIG. 7 illustrates an exemplary process, consistent with the present invention, for constructing a search query. Assume in act 520 that the server 120 produces an n-best hypothesis list 525. Using the hypothesis list 525, the server 120 may determine the length (MinLen) of the shortest hypothesis within the top T hypotheses [act 710].

The server 120 may then remove noise words, such as "the," "of," "for," etc., that were incorrectly inserted by the server 120 during the speech recognition process to prune each hypothesis up to the length MinLen [act 720]. The server 120 may determine the length (MaxLen) of the longest pruned hypothesis [act 730]. The server 120 may, for example, determine MaxLen via a comparison operation. The server 120 may select k hypotheses from the n-best hypothesis list 525 [act 740], where $$k = 1 + \frac{WordLimit - \text{Max}Len}{\text{Max}Len * ProportionNewWords}.$$

The server 120 may then obtain the weights 532 for the selected hypotheses [act 750]. The server 120 may form a weighted boolean query [act 760]. For the example above, the server 120 may produce the following boolean query:

0.8 (white house) OR 0.73 (light house) OR 0.6 (white mouse) OR 0.35 (light mouse).

Alternatively, the server 120 may produce the following query:

$$\begin{pmatrix} 0.8 \text{ white} \\ \text{OR} \\ 0.5 \text{ light} \end{pmatrix}$$

AND $$\begin{pmatrix} 0.7 \text{ house} \\ \text{OR} \\ 0.4 \text{ mouse} \end{pmatrix}.$$

In forming the boolean search query, terms may be repeated if necessary. For example, assume that the server 120 produces the following hypothesis list:

AB

CDE

FGH.

Assuming that each of these hypotheses is weighted equally, the server 120 may produce the following search query based on this hypothesis list:

$$\begin{pmatrix} A \\ \text{OR} \\ C \\ \text{OR} \\ F \end{pmatrix}$$

AND $$\begin{pmatrix} B \\ \text{OR} \\ D \\ \text{OR} \\ G \end{pmatrix}$$

AND $$\begin{pmatrix} B \\ \text{OR} \\ E \\ \text{OR} \\ H \end{pmatrix}.$$

Since the first hypothesis (AB) includes fewer terms than the other hypotheses, the server 120 may reuse one of the terms from the first hypothesis.

Once the weighted search query has been formed, the server 120 may, through the use of the search engine 125, perform a search using the query via any conventional technique [act 540]. The server 120 may then tailor the search results based on the query term weights 532. For example, the query term weights 532 may be provided as an input to the search engine 125 along with the query terms. The search engine 125 could use the query term weights 532 to determine how to rank the search results. For the example above, the search engine 125 may boost the ranking of a search result that contains "white house" compared to one that contains "light mouse," since "white house" is weighted more heavily.

The server 120 may also use the query term weights to filter (or organize) the search results obtained by the search engine 125. For example, suppose the search engine 125 normally displays 10 search results per query. The server 120 may use the relative weights of the different hypotheses/terms to ensure that the first 10 results contain results that are proportional to the relative weights. As an example, the relative weight associated with "white house" in FIG. 6A is 0.32 (i.e., 0.8/2.48), and the relative weight of "light mouse" is 0.14 (0.35/2.48). Using these weights, the server 120 could filter the search results so that 3.2 (rounded to 3) of the first 10 search results are relate to "white house" and 1.4 (rounded to 1) of the results relate to "light mouse." Furthermore, it may be desirable to list the "white house" search results before the "light mouse" search results due to its higher relative weight. It will be appreciated that other ways of filtering search results using the query term weights may alternatively be used.

In another implementation consistent with the present invention, the server 120 may use the query term weights to eliminate (i.e., not use as part of the search query) hypotheses or terms that have a weight/confidence score below a predefined threshold value. For example, assume that the threshold was set such that hypotheses with a weight 0.4 or below should be eliminated. For the hypothesis list provided above with respect to FIG. 6A, the server 120 may eliminate the hypothesis "light mouse" since it is associated with a weight below the threshold value of 0.4.

Once the search results have been obtained, the server 120 may use these search results to refine the search query. For example, assume that the server 120 constructs a boolean search query using the hypotheses listed in FIG. 6A. Assume further that none of the documents obtained by the search engine 125 correspond to the hypothesis "light mouse." In such a case, the server 120 may discard that hypothesis from the original list, create a new boolean search query using the remaining hypotheses, and then perform a search using the new search query. The server 120 may perform this iteration once, or repeatedly until, for example, each of the hypotheses has search results associated with it.

As an alternative to deleting a hypothesis if there are no corresponding search results, the server 120 may modify the weights (confidence scores) of those hypotheses based on the contents of the documents corresponding to the search results. Here, the server 120 may, for example, increase the weights associated with those hypotheses or terms relating to a high number of results.

In yet a further implementation consistent with the present invention, the server 120 may consider compounds in performing or refining the search. In some conventional searching techniques, a search engine may obtain better results for the compound "new york restaurants" than the search engine would return if the terms "new," "york," and "restaurants" were separately entered. According to this exemplary implementation, the server 120 may develop the n-best hypothesis list 525, feed it into a search engine 125, evaluate the search results to identify compounds, and revise the hypothesis list based on the identified compounds. As an alternative to identifying compounds after receiving search results, the server 120 may detect compounds prior to constructing the search query 535. In such a situation, the server 120 may then replace an existing hypothesis with the compound when constructing the search query.

Once the search results have been obtained, the server 120 may then provide the results to the user via the client 110 [act 545]. The server 120 may, for example, cause the results to be displayed to the user.

CONCLUSION

A system and method consistent with the present invention provide a voice interface for search engines. Through the use of a language model, phonetic dictionary, and acoustic models, a server generates an n-best hypothesis list or word graph. The server uses the n-best hypothesis list or word graph to construct a search query to cover possible possibilities. As a result, the server is capable of returning relevant search results for even queries containing few words.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, while series of acts have been presented with respect to FIGS. 5 and 7, the order of the acts may be altered in other implementations consistent with the present invention. No element, act, or instruction used in the description of the present application should be construed as critical or essential to the invention unless explicitly described as such.

The scope of the invention is defined by the following claims and their equivalents.

What is claimed is:

1. A method comprising:
   receiving, by one or more processors associated with a device, a voice query;
   determining, by the one or more processors, a plurality of word hypotheses for the voice query,
      each word hypothesis of the plurality of word hypotheses including a respective one or more terms;
   accessing, by the one or more processors, a search query log;
   determining, by the one or more processors, respective weights associated with the plurality of word hypotheses based on the search query log;
   generating, by the one or more processors and based on the respective weights, a first search query from the plurality of word hypotheses;
   accessing, by the one or more processors and based on the first search query, a first set of search results;
   modifying, by the one or more processors and based on the first set of search results, one or more of the weights;
   generating, by the one or more processors and based on modifying the one or more weights, a second search query; and
   obtaining, by the one or more processors and using the second search query, a second set of search results as a response to the voice query.

2. The method of claim 1, further comprising:
   providing, for display, the second set of search results as the response to the voice query.

3. The method of claim 1, further comprising:
   determining a quantity of the first set of search results related to a particular word hypothesis of the plurality of word hypotheses; and
   removing, when the quantity of the first set of search results related to the particular word hypothesis does not satisfy a threshold value, the particular word hypothesis from the plurality of word hypotheses.

4. The method of claim 1, further comprising:
   modifying a ranking associated with each search result included in the second set of search results based on the weight for each word hypothesis.

5. The method of claim 1, where determining the plurality of word hypotheses for the voice query further includes:
   identifying a language associated with the voice query; and
   determining the plurality of word hypotheses based on the identified language.

6. The method of claim 5, where determining the respective weights includes:
   determining the respective weights based on a language model associated with the language.

7. The method of claim 1, where determining the plurality of word hypotheses for the voice query further includes:
   determining a feature vector based on performing an acoustic feature extraction process on the voice query; and
   determining the plurality of word hypotheses based on feature vector.

8. A system comprising:
   one or more computers to:
      receive a voice query;
      determine a plurality of word hypotheses for the voice query,
         each word hypothesis of the plurality of word hypotheses including a respective one or more terms;
access a search query log;
determine respective weights associated with the plurality of word hypotheses based on the search query log;
generate, based on the respective weights, a first search query from the plurality of word hypotheses;
access, based on the first search query, a first set of search results;
modify, based on the first set of search results, one or more of the weights;
generate, based on modifying the one or more of the weights, a second search query from the plurality of word hypotheses; and
obtain, based on the second search query, a second set of search results as a response to the voice query.

9. The system of claim 8, where the one or more computers are further to:
provide, for display, the second set of search results as the response to the voice query.

10. The system of claim 9, where the one or more computers are further to:
determine a quantity of the first set of search results related to a particular word hypothesis of the plurality of word hypotheses; and
remove, when the quantity of the first set of search results related to the particular word hypothesis does not satisfy a threshold value, the particular word hypothesis from the plurality of word hypotheses.

11. The system of claim 9, where the one or more computers are further to:
modify a ranking associated with each search result included in the second set of search results based on the weight for each word hypothesis.

12. The system of claim 8, where the one or more computers, when determining the plurality of word hypotheses for the voice query, are further to:
identify a language associated with the voice query; and
determine the plurality of word hypotheses based on the identified language.

13. The system of claim 12, where the one or more computers, when determining the respective weights, are further to:
determine the respective weights based on a language model associated with the language.

14. The system of claim 8, where the one or more computers, when determining the plurality of word hypotheses for the voice query, are further to:
derive a feature vector based on the voice query; and
determine the plurality of word hypotheses based on the feature vector.

15. A non-transitory memory device storing instructions, the instructions comprising:
one or more instructions that, when executed by one or more processors, cause the one or more processors to:
receive a voice query;
determine a plurality of word hypotheses for the voice query,
each word hypothesis of the plurality of word hypotheses including
a respective one or more terms;
access a search query log;
determine respective weights associated with the plurality of word hypotheses based on the search query log;
generate, based on the respective weights, a first search query from the plurality of word hypotheses;
access, based on the search query, a first set of search results;
modify, based on the first set of search results, one or more of the weights;
generate, based on modifying the one or more of the weights, a second search query from the plurality of word hypotheses; and
obtain, based on the second search query, a second set of search results as a response to the voice query.

16. The non-transitory memory device of claim 15, where the instructions further include:
one or more instructions that, when executed by the one or more processors, cause the one or more processors to:
provide, for display, the second set of search results as the response to the voice query.

17. The non-transitory memory device of claim 16, where the instructions further include:
one or more instructions that, when executed by the one or more processors, cause the one or more processors to:
determine a quantity of the first set of search results related to a particular word hypothesis of the plurality of word hypotheses; and
remove, when the quantity of the first set of search results related to the particular word hypothesis does not satisfy a threshold value, the particular word hypothesis from the plurality of word hypotheses.

18. The non-transitory memory device of claim 15, where the one or more instructions, to determine the plurality of word hypotheses for the voice query, further include:
one or more instructions that, when executed by one or more processors, cause the one or more processors to:
identify a language, of a plurality of languages, associated with the voice query; and
determine the plurality of word hypotheses based on the identified language.

19. The non-transitory memory device of claim 18, where the one or more instructions, to determine the respective weights, further include:
one or more instructions that, when executed by one or more processors, cause the one or more processors to:
determine the respective weights based on a language model associated with the language.

20. The non-transitory memory device of claim 15, where the one or more instructions, to determine the plurality of word hypotheses for the voice query, further include:
one or more instructions that, when executed by one or more processors, cause the one or more processors to:
determine a feature vector based on the voice query; and
determine the plurality of word hypotheses based on the feature vector.

\* \* \* \* \*